(12) United States Patent
Oku

(10) Patent No.: US 7,810,979 B2
(45) Date of Patent: Oct. 12, 2010

(54) ILLUMINATING DEVICE WITH PRIMARY COLOR LED AND FLUORESCENT LIGHT SOURCES, AND LIQUID CRYSTAL DISPLAY DEVICE

(75) Inventor: Takashi Oku, Saitama (JP)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 11/143,115

(22) Filed: Jun. 2, 2005

(65) Prior Publication Data

US 2005/0269560 A1    Dec. 8, 2005

(30) Foreign Application Priority Data

Jun. 2, 2004 (JP) ............................. 2004-164785

(51) Int. Cl.
*G02F 1/13363* (2006.01)

(52) U.S. Cl. ............... 362/613; 362/231; 362/97.3; 362/611; 362/614; 362/246; 349/68

(58) Field of Classification Search .............. 362/613, 362/228, 231, 601, 611, 614, 97.3, 240, 246, 362/249.02; 349/68
See application file for complete search history.

(56) References Cited

U.S. PATENT DOCUMENTS

| | | | | |
|---|---|---|---|---|
| 5,375,043 A | * | 12/1994 | Tokunaga | 362/601 |
| 5,921,652 A | * | 7/1999 | Parker et al. | 362/601 |
| 6,315,440 B1 | * | 11/2001 | Satoh | 362/561 |
| 6,419,372 B1 | * | 7/2002 | Shaw et al. | 362/231 |
| 6,655,825 B2 | * | 12/2003 | Muthu et al. | 362/561 |
| 6,672,733 B2 | * | 1/2004 | Nagatani | 362/614 |
| 6,840,646 B2 | * | 1/2005 | Cornelissen et al. | 362/606 |
| 6,885,360 B2 | * | 4/2005 | Hara et al. | 345/102 |
| 2002/0126478 A1 | * | 9/2002 | Cornelissen et al. | 362/228 |
| 2003/0067436 A1 | * | 4/2003 | Hara et al. | 345/102 |
| 2006/0012989 A1 | * | 1/2006 | Lee | 362/231 |
| 2006/0023447 A1 | * | 2/2006 | Justel et al. | 362/231 |
| 2006/0245209 A1 | * | 11/2006 | Jeong et al. | 362/612 |

FOREIGN PATENT DOCUMENTS

| | | | |
|---|---|---|---|
| EP | 399173 A2 | * | 11/1990 |
| JP | 63-023710 | | 2/1988 |
| JP | 05-078018 A | | 3/1993 |
| JP | 06-150706 A | | 5/1994 |
| JP | 2001-135118 A | | 5/2001 |
| JP | 2003-140110 | | 5/2003 |
| JP | 2003140110 A | * | 5/2003 |
| JP | 2003-330424 A | | 11/2003 |
| JP | 2003-331608 | | 11/2003 |
| KR | 1020050002566 | * | 7/2005 |

* cited by examiner

*Primary Examiner*—Ismael Negron
(74) *Attorney, Agent, or Firm*—Wolf, Greenfield & Sacks, P.C.

(57) ABSTRACT

An illumination device including a first light source for emitting light of a first primary color, a second light source for emitting light of a second primary color, and a third light source for emitting light of a third primary color, wherein the first light source is a light emitting diode, the second light source is a fluorescent tube, and the third light source is either a light emitting diode or a fluorescent tube. The illumination device generates white light by mixing the light emitted by the first, second and third light sources. A liquid crystal panel is illuminated with the white light generated by the illumination device.

15 Claims, 15 Drawing Sheets

ILLUMINATING DEVICE WITH PRIMARY COLOR LED AND FLUORESCENT LIGHT SOURCES, AND LIQUID CRYSTAL DISPLAY DEVICE

CROSS REFERENCES TO RELATED APPLICATIONS

The present invention contains subject matter related to Japanese Patent Application JP 2004-164785 filed in the Japanese Patent Office on Jun. 2, 2004, the entire contents of which being incorporated herein by reference.

BACKGROUND OF THE INVENTION

1. Field of the Invention

The present invention relates to an illuminating device for illuminating an object to be illuminated by a white light generated by using a light emitting diode. The present invention also relates to a liquid crystal display device having a liquid crystal panel and an illuminating device for illuminating the liquid crystal panel, and more particularly to a liquid crystal display device having an illuminating device for illuminating a liquid crystal panel by a white light generated by using a light emitting diode.

2. Description of Related Art

As a display provided for a television, a personal computer, a portable electronic device, etc., a thin light weight liquid crystal display has been widely used. The liquid crystal display has a liquid crystal panel for displaying an image, but the liquid crystal panel is not self-luminous. Therefore, the liquid crystal display has an illuminating device for illuminating the liquid crystal panel, such as a backlight device for illuminating the liquid crystal panel from its back surface.

As a light source used frequently in the backlight device, there is a cold cathode fluorescent lamp (hereinafter referred to as "CCFL"). However, since the CCFL uses mercury, when the backlight device is, for example, broken, there is a possibility of giving an adverse influence to an environment, due to flowing out of the mercury or the like.

Then, a backlight device using a light emitting diode (hereinafter referred to as "LED") is proposed (refer, for example, Patent Document 1: Jpn. U.M. Appln. Publication No. 7-36347 and Patent Document 2: PCT Appln. Laid-Open Publication No. 2000-540458).

SUMMARY OF THE INVENTION

There are, as the LED, a red LED for emitting a red light, a green LED for emitting a green light, and a blue LED for emitting a blue light. As shown by R, G and B in FIG. 1, a light emitted from each LED does not include a light having a wavelength except an object wavelength band. Therefore, a white light which contains a small amount of the wavelength except wavelength band showing red, green and blue colors can be obtained by mixing the red light emitted from the red LED, the green light emitted from the green LED, and the blue light emitted from the blue LED.

On the other hand, a white light emitted from the CCFL contains, as shown by C in FIG. 1, a large amount of the wavelength except the wavelength bands showing red, green and blue colors.

The less the amount of the wavelength except the wavelength bands showing red, green and blue colors included in the white light for illuminating the liquid crystal panel is, the higher a color reproducibility of the liquid crystal display device becomes. Therefore, as shown in FIG. 2, the liquid crystal panel is illuminated with the white light obtained by mixing the red light, the green light and the blue light emitted from the respective LEDs by using the red LED, the green LED and the blue LED as the light source of the backlight device. Accordingly, the color reproducibility of the liquid crystal display device is improved as compared with the case using a CCFL as a light source. Incidentally, a triangle T11 in FIG. 2 shows the color reproducibility of the liquid crystal display device when the red LED, green LED and blue LED are used as a light source of the backlight device, and a triangle T12 shows the color reproducibility of the liquid crystal display device when the CCFL is used as the light source of the backlight device.

However, it is assumed that the light-emitting efficiency of the red LED and green LED is about 20 lumens/W, and the light-emitting efficiency of the blue LED is about 5 lumens/W. On the other hand, it is assumed that the light-emitting efficiency of the CCFL is about 50 lumens/W. That is, the light-emitting efficiency of each LED is lower than that of the CCFL, and particularly, it is assumed that the light-emitting efficiency of the blue LED is about $1/10$ of that of the CCFL.

Therefore, when the LED is used as the light source, it is difficult to obtain sufficient luminance, and if the size of the liquid crystal display device is increased to a certain degree, it is difficult to illuminate the liquid crystal panel wholly.

Also, since the size of the LED is small, for example, a bottom is a circular shape having a diameter of about 9.6 mm and a height is about 6.09 mm, a range that is illuminated by the emitted light is narrow. Since the range illuminated by the light emitted from the LED is narrow, when the LED is used as the light source of the backlight device, it is necessary to use a plurality of LEDs by aligning the LEDs in a row or in a planar state.

However, since the LED is expensive, when the backlight device is manufactured by using many LEDs, a cost for manufacturing the backlight device is increased. Therefore, the liquid crystal display having the backlight device using the LEDs becomes expensive.

The present invention is proposed in view of the conventional circumstances as described above, and it is desirable to provide an illuminating device which emits a white light containing a small amount of a wavelength except wavelength bands showing red, green and blue colors and in which an amount of emitting light is sufficient and a cost required to manufacture is low as well as a liquid crystal display device which has high color reproducibility, and in which the liquid crystal panel is illuminated with a sufficient amount of light and a cost required for manufacture is low.

According to the present invention, there is provided an illuminating device which generates a white light by mixing a light of a wavelength band showing a first primary color, a light of a wavelength band showing a second primary color and a light of a wavelength band showing a third primary color, and which illuminates a liquid crystal panel with the generated white light, comprising: a first light source for emitting the light of the wavelength band showing the first primary color; a second light source for emitting the light of the wavelength band showing the second primary color; and a third light source for emitting the light of the wavelength band showing the third primary color, wherein the first light source is a light emitting diode, the second light source is a fluorescent tube, and the third light source is either of a fluorescent tube or a light emitting diode.

According to the present invention, there is also provided a liquid crystal display device having a transmission type liquid crystal panel, and an illuminating device for illuminating the liquid crystal panel from one main surface side, wherein the illuminating device comprises: a first light source for emitting a light of a wavelength band showing a first primary color; a second light source for emitting a light of a wavelength band showing a second primary color; and a third light source for emitting a light of a wavelength band showing a third primary color, where the first light source is a light emitting diode, the second light source is a fluorescent tube, and the third light source is either of a fluorescent tube or a light emitting diode, and wherein the illuminating device generates a white light by mixing the light of the wavelength band showing the first primary color, the light of the wavelength band showing the second primary color and the light of the wavelength band showing the third primary color, and illuminates the liquid crystal panel with the generated white light.

In the illuminating device according to the present invention, one or two of the red light, the green light and the blue light as origins of the white light to be emitted are emitted from the fluorescent tube, and the residual two or one is emitted from the light emitting diode. The light emitted from the fluorescent tube contains a large amount of light, and the light emitted from the light emitting diode contains a small amount of light except the object wavelength band.

Therefore, the white light emitted from the backlight device according to the present invention contains a small amount of light of the wavelength except the wavelengths showing the red, green and blue colors and a large amount of light. That is, in accordance with the backlight device according to the present invention, by illuminating the liquid crystal panel with the white light which contains a small amount of the light of the wavelength except the wavelengths showing red, green and blue colors and a high luminance, the color reproducibility of the image displayed on the liquid crystal display device can be improved and an image displayed on the display device can be clearly shown.

Since the fluorescent tube is less expensive than the light-emitting diode necessary to emit the light of the same light amount, the backlight device according to the present invention can suppress the cost for its manufacture by using the fluorescent tube as the light source.

Also, since the fluorescent tube generates a little heat as compared with a light emitting diode, the backlight device according to the present invention does not need to place a cooler, such as a fan, etc., by using the fluorescent tube as the light source, which can simplify its construction.

The liquid crystal display device according to the present invention emits one or two of the red, green and blue colors, which are origins of the white light emitted from the backlight device, from the fluorescent tube, and the residual two or one is emitted from the light emitting diode.

Therefore, in the liquid crystal display device according to the present invention, the backlight device emits the white light having a little light of a wavelength other than the wavelength showing the red, green and blue colors and having a high luminance and illuminates the liquid crystal panel. That is, according to the backlight device of the present invention, since the liquid crystal panel is illuminated by the white light having a little light of the wavelength other than the wavelength showing the red, green and blue colors and having high luminance, the color reproducibility of the displayed image is improved and the image is displayed clearly.

DETAILED DESCRIPTION OF THE PREFERRED EMBODIMENTS

Figure 1:
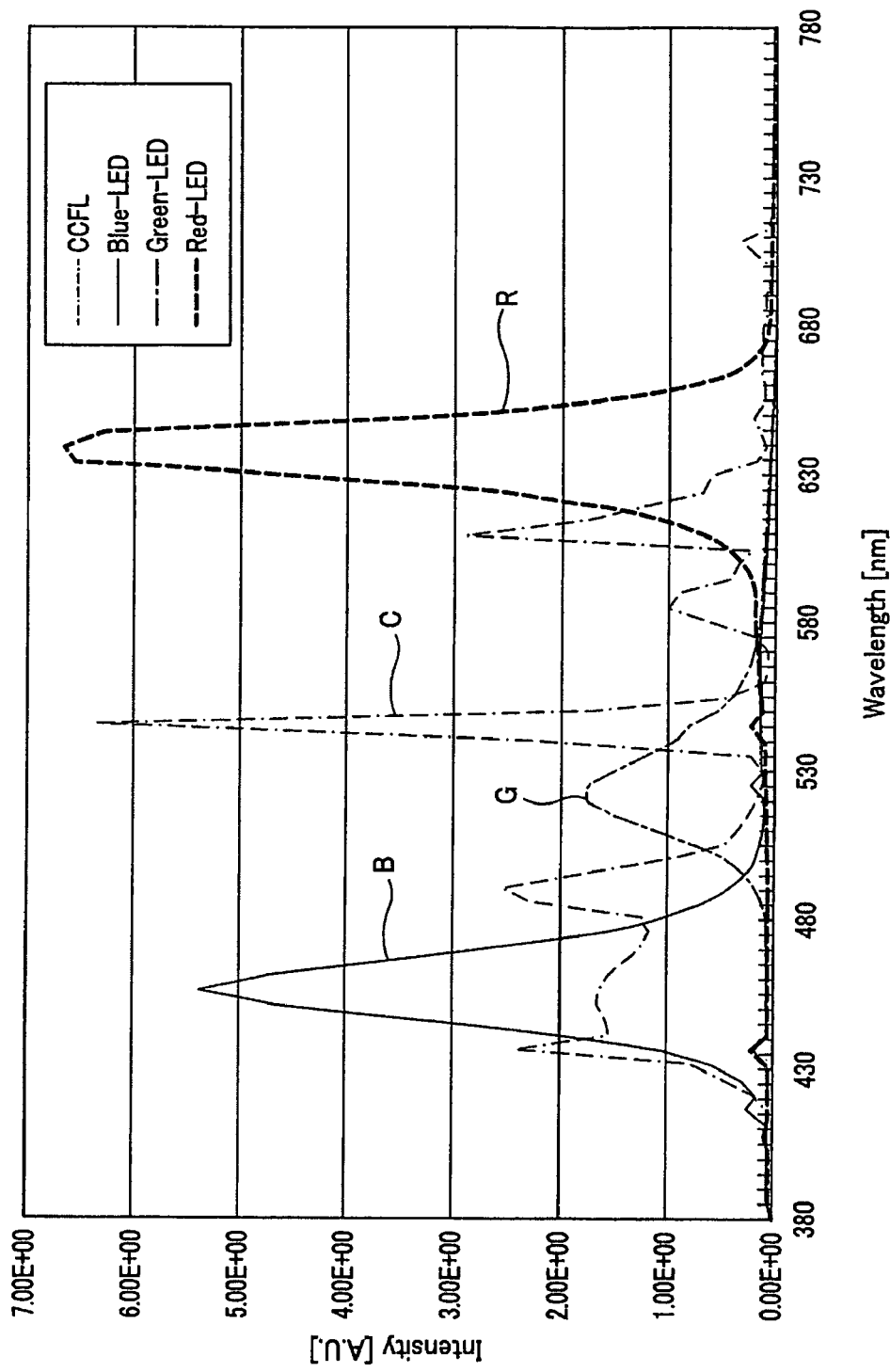
FIG. 1 is a view showing wavelength distribution of a red light, a green light and a blue light emitted from LEDs and wavelength distribution of a white light emitted from a CCFL for emitting a white light.
Figure 2:
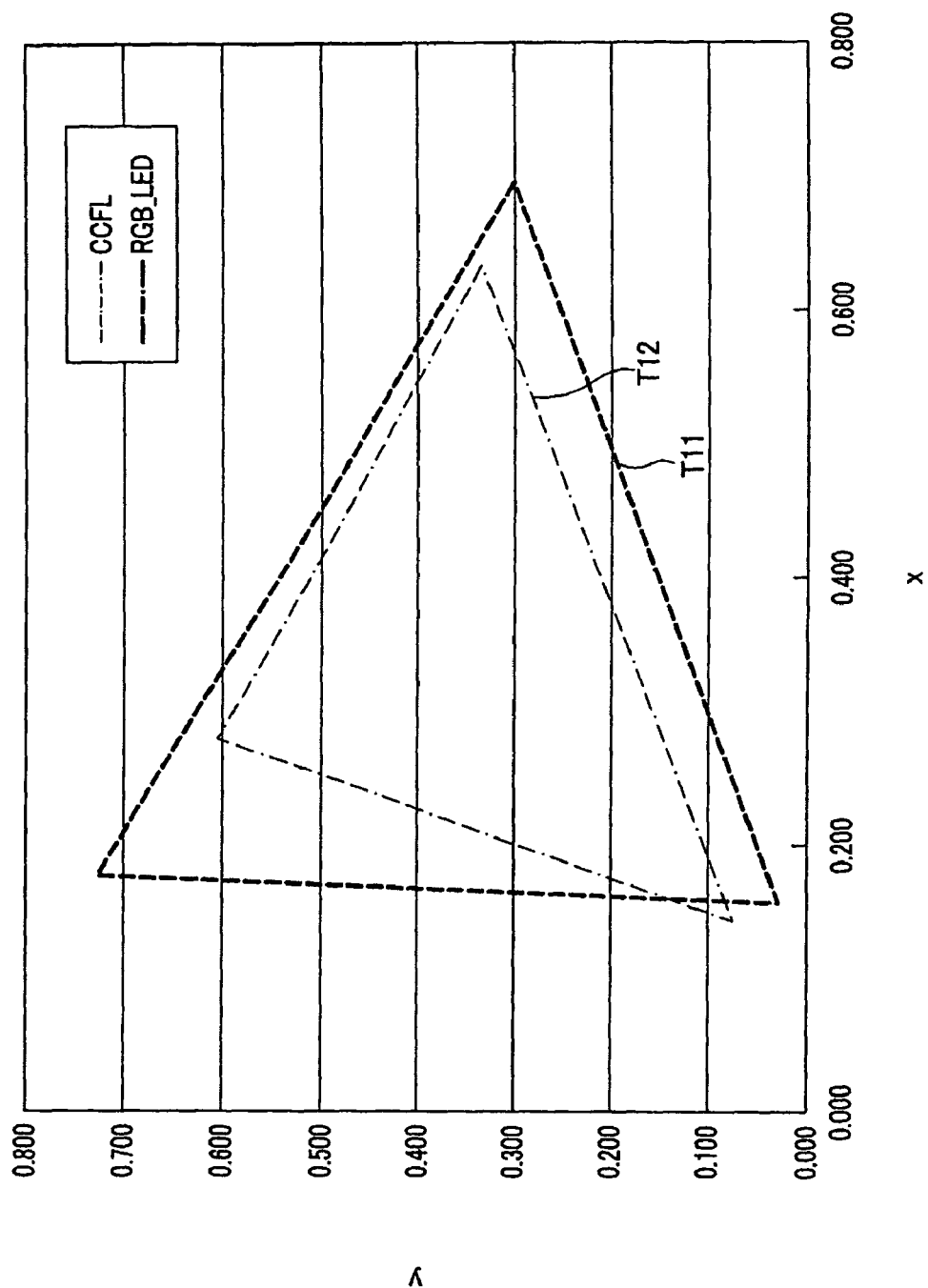
FIG. 2 is a view showing the color reproducibility of a conventional backlight device.

Embodiments of the present invention will be described in detail while referring to the drawings.

A best mode for carrying out the present invention will be described in detail while referring to the drawings.

Figure 3:
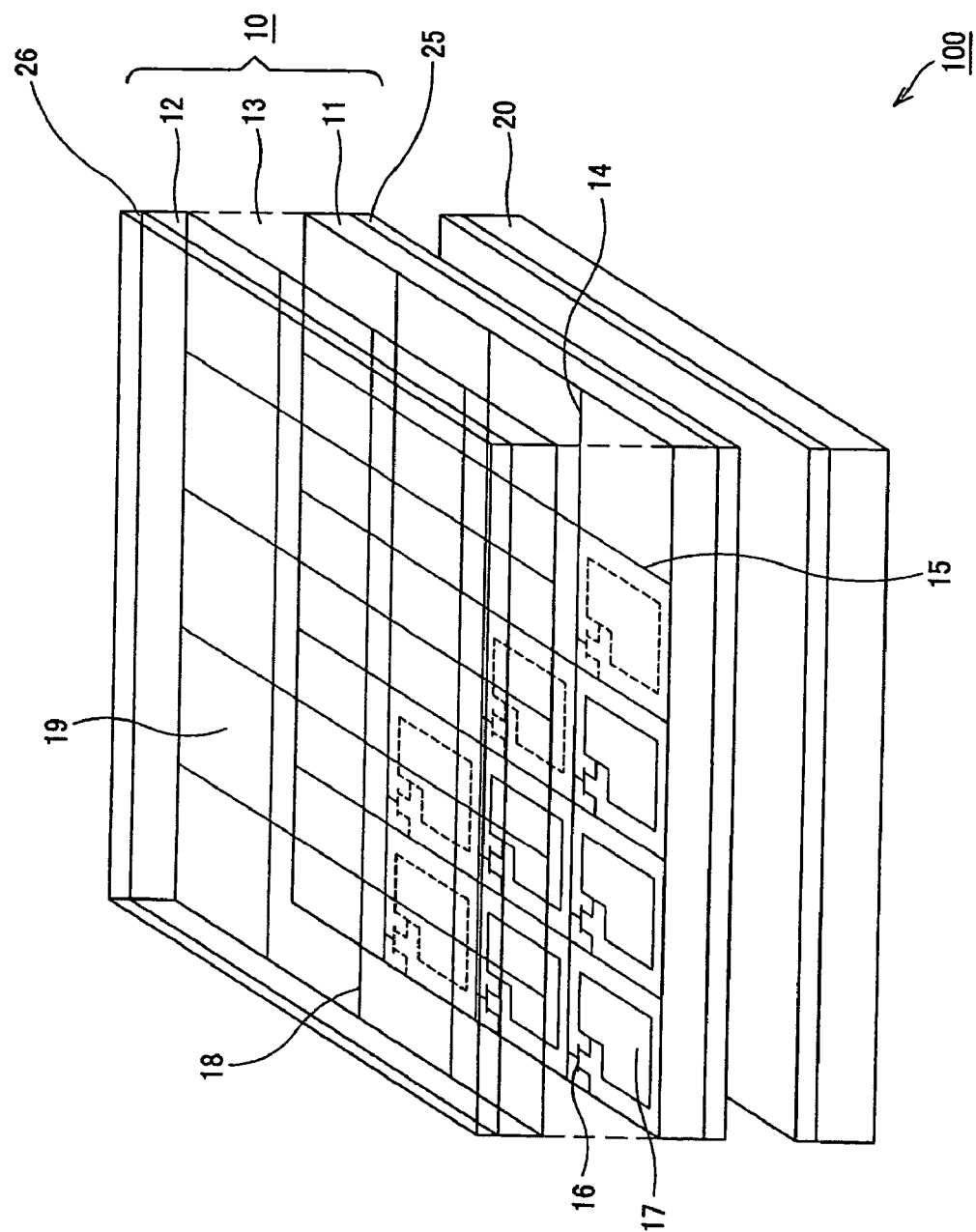
FIG. 3 is a schematic perspective view showing a structure of a liquid crystal display device according to the present invention.

The present invention is applied to a back light type liquid crystal display device 100 of a structure as shown, for example, in FIG. 3. In the embodiments of the present invention, the liquid crystal display device 100 has an aspect ratio of 9:16 and a size of 17 inches.

The liquid crystal display device 100 comprises a transmission type liquid crystal panel 10, and a backlight device 20 provided on one main surface side (hereinafter referred to as "back surface side") of the liquid crystal panel 10. The user observes an image projected on the liquid crystal panel 10 from the other main surface side (hereinafter referred to as "front surface side").

The liquid crystal panel 10 has a structure that a TFT substrate 11 and an opposed electrode substrate 12 which are two transparent substrates each made of glass or the like are disposed oppositely to each other, and a liquid crystal layer 13 in which a twisted nematic liquid crystal is sealed in the gap between the TFT substrate 11 and the electrode substrate 12.

Signal lines 14 and scanning lines 15 disposed in a matrix state are formed on the TFT substrate 11. Thin film transistors 16 as switching elements disposed at intersection points of the signal lines 14 and the scanning lines 15 and pixel electrodes 17 are formed on the TFT substrate 11. The thin film transistors 16 are sequentially selected by the scanning lines 15, and video signals supplied from the signal lines 14 are written in the corresponding pixel electrodes 17.

On the other hand, the opposed electrodes 18 and color filters 19 are formed on an inner surface of the opposed electrode substrate 12. Incidentally, in the liquid crystal panel 10, the side disposed with the TFT substrate 11 is defined as the back surface side, and the side disposed with the opposed electrode substrate 12 is defined as the front surface side.

In this liquid crystal display device 100, the liquid crystal panel 10 of the structure as described above is sandwiched between two polarizing plates 25 and 26, and active matrix driven by the backlight device 20 in a state that the white light is illuminated from the back surface side, thereby obtaining a desired full-color video display. Incidentally, the backlight device 20 will be described in detail later.

Figure 4:
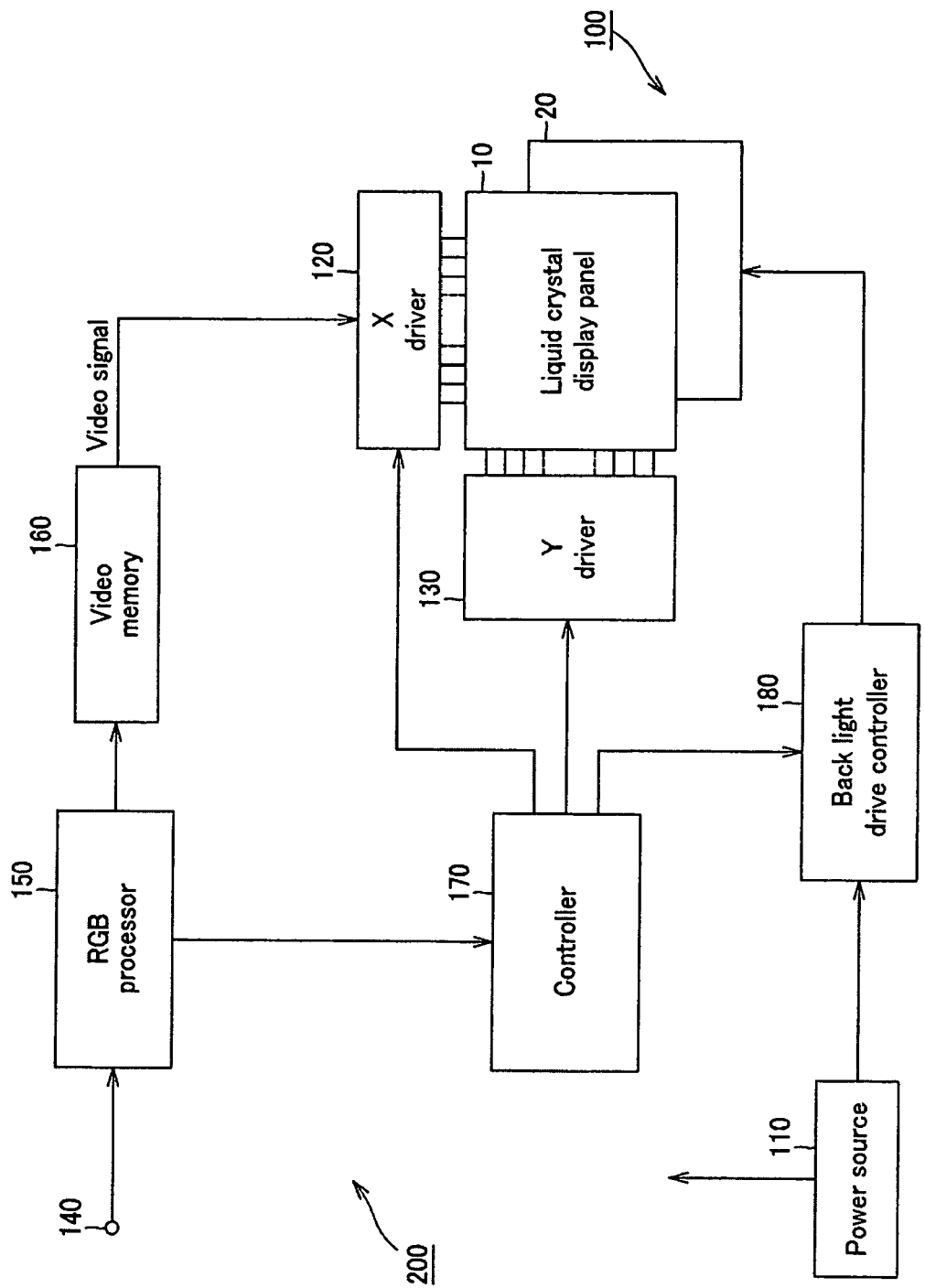
FIG. 4 is a block diagram showing a drive circuit of the liquid crystal display device.

This liquid crystal display device 100 is driven by a drive circuit 200 showing an electrical block structure shown, for example, in FIG. 4.

The drive circuit 200 comprises a power source 110 for supplying a drive power of the liquid crystal panel 10 and the backlight device 20, an X driver circuit 120 and a Y driver circuit 130 for driving the liquid crystal panel 10, an RGB processor 150 to which a video signal is supplied from the outside through an input terminal 140, a video memory 160 and a controller 170 connected to this RGB processor 150, a back light drive controller 180 for controlling to drive the backlight device 20, etc.

In this drive circuit 200, the video signal inputted through the input terminal 140 is signal processed by chroma processing, etc., by the RGB processor 150, further converted into an RGB separate signal suitable for driving the liquid crystal panel 10 from a composite signal, and supplied to the controller 170, and supplied to the X driver circuit 120 through the video memory 160. Also, the controller 170 controls the X driver circuit 120 and the Y driver circuit 130 at a predetermined timing in response to the RGB separate signal, and drives the liquid crystal panel 10 according to the RGB separate signal supplied to the X driver circuit 120 through the video memory 160, and thereby displaying the video in response to the RBG separate signal.

Then, the backlight device 20 will be described.

First Embodiment

First, a first embodiment of the backlight device 20 according to the present invention will be described.

Figure 5:
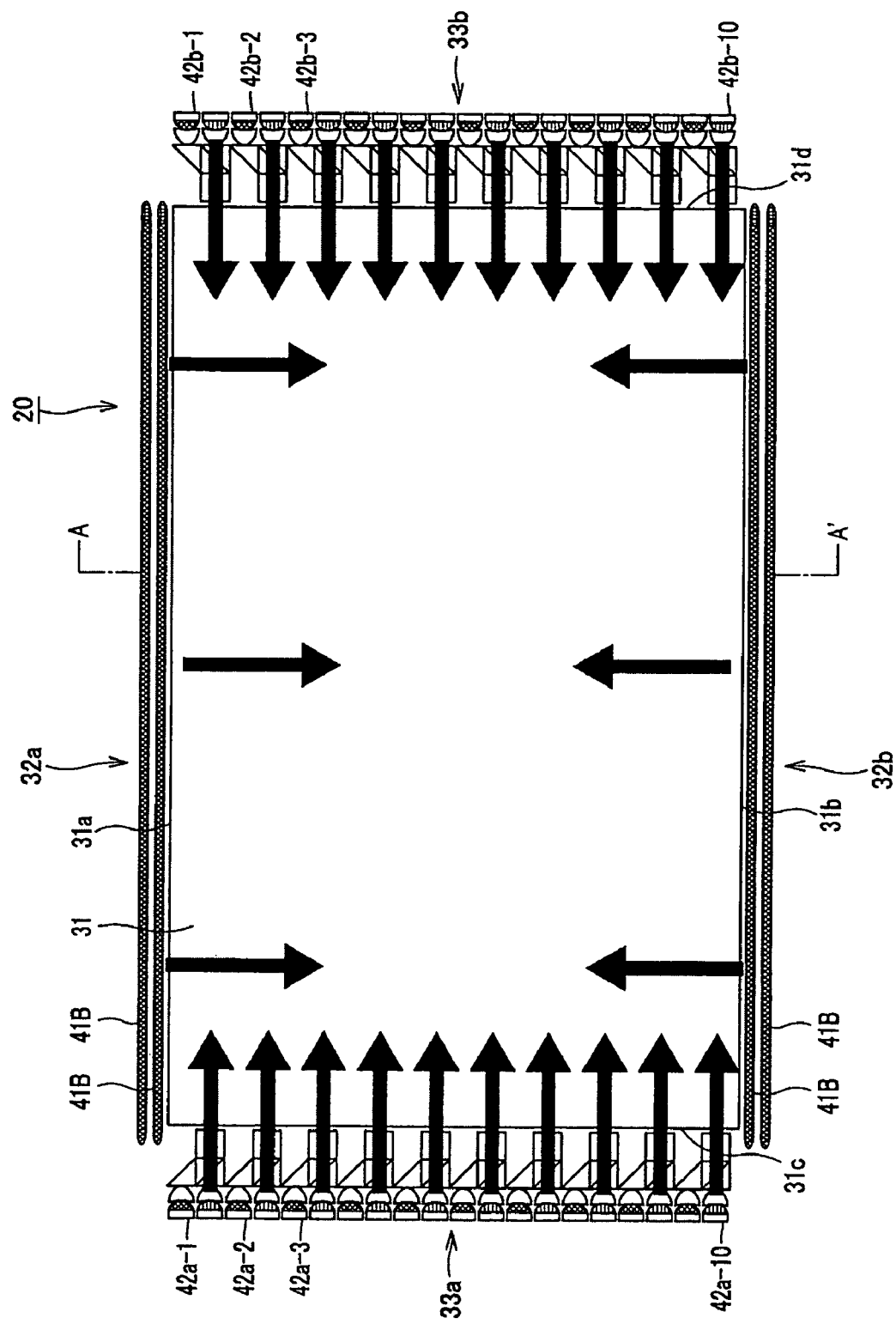
FIG. 5 is a plan view showing the backlight device according to the present invention.

As shown in FIG. 5, the backlight device 20 comprises a flat plate-like optical waveguide 31, blue light emitting units 32a, 32b provided at both end faces 31a, 31 b of a width direction of the optical waveguide 31, and yellow light emitting units 33a, 33b provided at both end faces 31c, 31d of a longitudinal direction of the optical waveguide 31.

Figure 6:
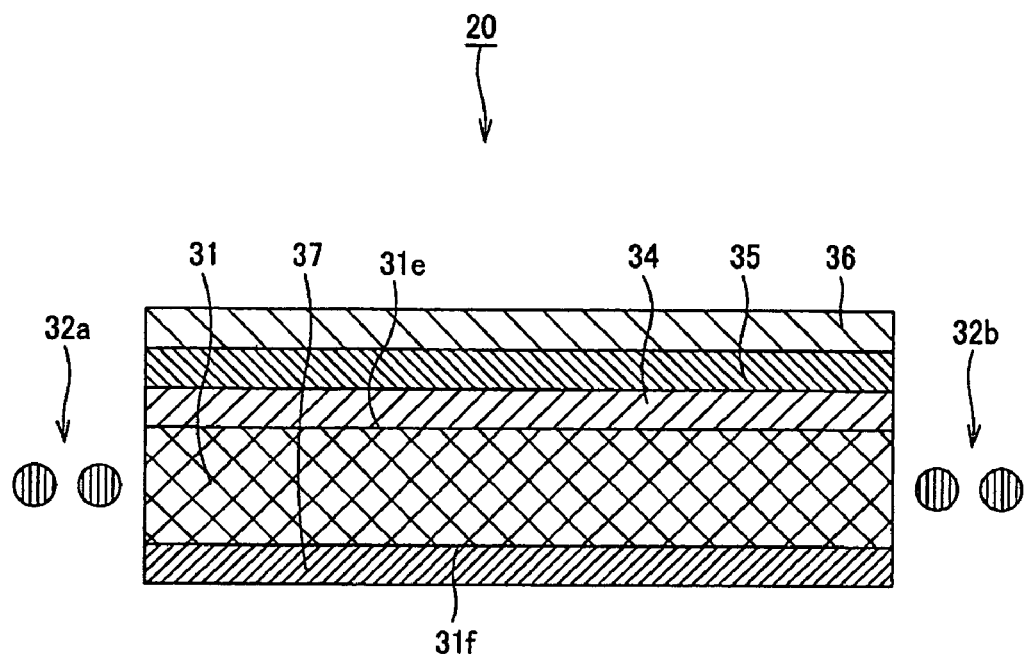
FIG. 6 is a sectional view showing the backlight device.

As shown in FIG. 6, the backlight device 20 has a diffusing sheet 34, a first lens sheet 35, and a second lens sheet 36 sequentially disposed at a light emitting surface 31e side of a main surface of the liquid crystal panel 10 side of the optical waveguide 31, and a reflecting sheet 37 disposed at the reflecting surface 31f side of an opposed surface to the light emitting surface 31e. Incidentally, FIG. 6 is a cross-sectional view taken along the line A-A' in FIG. 5.

The optical waveguide 31 is a transparent plate having a predetermined thickness. The aspect ratio and the size of the optical waveguide 31 is the same as those of the liquid crystal panel 10. In this embodiment, the aspect ratio of the liquid crystal panel 10 is 9:16 and the size thereof is 17 inches. Accordingly, the aspect ratio of the optical waveguide 31 is 9:16 and the size thereof is 17 inches. The aspect ratio and the size of the optical waveguide 31 do not define the present invention.

The optical waveguide 31 generates a white light while fully reflecting, guiding and mixing a yellow light incident from both the end faces 31c, 31d of a longitudinal direction and a blue light incident from both the end faces 31c, 31d of a width direction, and emits the white light generated from the light emitting surface 31e of one man surface of the optical waveguide 31.

The optical waveguide 31 is formed by injection molding a transparent thermoplastic resin, such as an acrylic resin, a methacrylic resin, a styrene resin, and a polycarbonate resin, etc. Also, a fine uneven shape, such as a prism pattern, a dot pattern, etc., is formed on a light reflecting surface 31f of the other main surface of the optical waveguide 31, and is processed to efficiently emit a light guided in the optical waveguide 31 in the direction of the light emitting surface 31e. The light incident in the optical waveguide 31 is emitted as a uniform light from the light emitting surface 31e entirety by this prism pattern, the dot pattern, etc.

A diffusing sheet 34 diffuses the white light emitted from the light emitting surface 31e to a uniform light. Also, the first lens sheet 35 and the second lens sheet 36 control to orient the light emitted from the diffusing sheet 34 to condense to the liquid crystal panel 10 side, that is, a front surface side.

A reflecting sheet 37 reflects the light emitted from the light reflecting surface 31f of the light guided by the optical waveguide 31, and returns the light to the inside of the optical waveguide 31. In the backlight device 20, the reflecting sheet 37 reflects the light emitted from the light reflecting surface 31f to return the light to the inside of the optical waveguide 31, thereby suppressing the loss of the amount of the light emitted from the light emitting surface 31e due to the flying out of the light from the optical waveguide 31.

The blue light emitting units 32a, 32b respectively have a cold cathode fluorescent lamp (hereinafter referred to as a "CCFL") 41B emitting the blue light. The blue CCFL 41B has a length substantially equal to a longitudinal direction of the optical waveguide 31, and is disposed substantially parallel to the longitudinal direction of the optical waveguide 31. The blue lights emitted from the blue CCFLs 41B provided in respective blue light emitting units 32a, 32b are incident from both end faces 31a, 31b of the width direction of the optical waveguide 31, and guided by the optical waveguide 31. The blue CCFL 41B is coated on its inner surface, for example, with a phosphor which emits a blue color, such as, for example, $BaMg_2Al_{16}O_{27}$:Eu, etc.

The light emitting efficiency of the blue CCFL 41B is said to be about 10 lumens/W. On the other hand, the light emitting efficiency of the light emitting diode (hereinafter referred to as "LED") for emitting a blue light is said to be about 5 lumens/W. That is, when the same power is consumed, the light emitted from the blue CCFL 41B becomes about twice as large as the blue light emitted from the LED which emits the blue light. Therefore, by using the blue CCFL 41B, while the power consumption remains set constant, an amount of the light emitted from the backlight device 20 can be increased.

The CCFL has a cheap cost as compared with the LED of the number needed to emit the light of the same amount. Therefore, the backlight device 20 can suppress its cost for manufacture by using the blue CCFL 41B as a light source.

Furthermore, the CCFL generates a little heat as compared with the LED. Therefore, the backlight device 20 eliminates necessity of carrying a cooler, such as a fan by using the blue CCFL 41B as a light source, which can simplify the structure.

Also, since the light emitted from the CCFL is small in directivity and good in spreading, the blue lights emitted from the blue light emitting units 32a, 32b spread over the optical waveguide 31 entirety, and is easily mixed with other light.

The yellow light emitting units 33a, 33b respectively have a plurality of light source units 42a-1 to 42a-10 aligned in one row along one end face of a width direction of the optical waveguide 31, and light source units 42b-1 to 42b-10 aligned in one row along the other end face. Incidentally, in the foregoing description, if it is not necessary to distinguish, the light source units 42a-1 to 42a-10, and the light source units 42b-1 to the light source units 42b-10 are totally termed as a light source unit 42.

Figure 7:
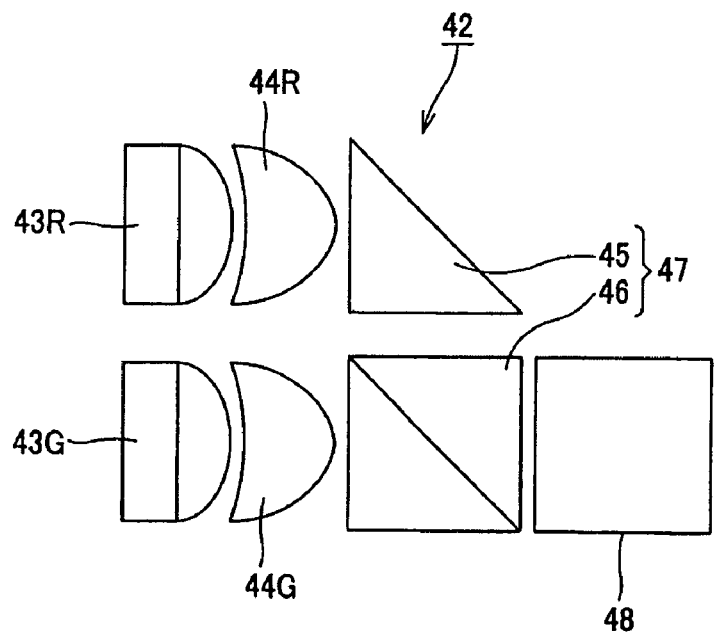
FIG. 7 is a plan view showing a light source unit provided in the backlight device.

As shown in FIG. 7, the light source unit 42 has a red LED (Light Emitting Diode) 43R, a green LED 43G (hereinafter totally referred to an LED 43). The light source unit 42 has a red light collective lens 44R disposed at the light emitting surface side of the red LED 43R, and a green light collective lens 44G disposed at the light emitting surface side of the green LED 43G (hereinafter totally referred to a collective lens 44). The light source unit 42 has a color mixer 47 having a reflecting prism 45 disposed at the light emitting surface side of the red light collective lens 44R, and a dichroic prism 46 disposed at the light emitting surface side of the green light collective lens 44G The light source unit 42 has an optical member 48 disposed at the light emitting side of the color mixer 47.

The red LED 43R emits a light of a wavelength band showing a red color, the green LED 43G emits a light of a wavelength band showing a green color. In this embodiment, as the red LED 43R and the green LED 43Q the LED having a light emitting efficiency of about 20 lumens/W is used.

The red light collective lens 44R introduces a diffusing light included in the red light emitted from the red LED 43R as a parallel light to the reflecting prism 45. The green light collective lens 45R introduces a diffusing light included in the green light emitted from the green LED 43G as a parallel light to the dichroic prism 46. The collective lens 44 sets the diffusing light included in the light emitted from the LED 43 to a parallel light to prevent the light emitted from the LED 43 from being leaked without being incident to the reflecting prism 45 and the dichroic prism 46, and to introduce the light emitted from the LED 43 efficiently to the optical waveguide 31.

The color mixer 47 mixes the red light incident to the reflecting prism 45 as the parallel light by the red light collective lens 44R with the green light incident to the dichroic prism 46 as the parallel light by the green light collective lens 44G, generates the light of the wavelength band showing a yellow color, and emits the light.

The reflecting prism 45 has a light incident surface 45a, a light emitting surface 45b provided perpendicularly crossed with the light incident surface 45a, and a light reflecting surface 45c provided at an angle of 45° to both the light incident surface 45a and the light emitting surface 45b.

The light is incident on the light incident surface 45a. The light reflecting surface 45c refracts a light incident from the light incident surface 45a at 90°, and advances the light in a light emitting surface 45b direction. The light emitting surface 45b emits the light reflected by the light reflecting surface 45c.

The reflecting prism 45 is opposed to the red light collective lens 44R at the light incident surface 45a, and disposed to be opposed to the dichroic prism 46 at the light emitting surface 45b. That is, in the reflecting prism 45, the red light emitted from the red LED 43R and then made as a parallel light by the red light collective lens 44R is incident to the light incident surface 45a, refracted at 90° by the light reflecting surface 45c, and then emitted from the light emitting surface 45b.

In this embodiment, as the reflecting prism 45, a right-angle prism in which one of two surfaces for interposing a right angle is set as a light incident surface 45a, and the other is set as a light emitting surface 45b, and an oblique surface is set as a light reflecting surface 45c, is used.

The dichroic prism 46 has a first light incident surface 46a, a second light incident surface 46b provided perpendicularly crossed with the first light incident surface 46a, a bonding surface 46c provided at an angle of 45° to both the first light incident surface 46a and the second light incident surface 46b, and a light emitting surface 46d provided at an angle of 45° to the bonding surface 46c perpendicularly crossed with the second light emitting surface.

The light is incident on the first light incident surface 46a and the second light incident surface 46b. The bonding surface 46c selectively transmits a light of the wavelength band showing a green color of the light incident in the dichroic prism 46, and selectively reflects the light of the wavelength band showing a red color of the light incident in the dichroic prism 46. The light emitting surface 46d emits a red light reflected by the bonding surface 46c and a green light transmitted through the bonding surface 46c.

The dichroic prism 46 is disposed so that the first light incident surface 46a is opposed to the green light collective lens 44G and the second light incident surface 46b is opposed to the light emitting surface 45b of the reflecting prism 45.

Therefore, to the dichroic prism 46, the green light set to a parallel light by the green light collective lens 44G after emitted from the green LED 43G is incident from the first light incident surface 46a, and the red light emitted from the reflecting prism 45 is incident from the second light incident surface 46b. The bonding surface 46c transmits the green light incident from the first light incident surface 46a, reflects the red light incident from the second light incident surface 46b, and refracts the red light at 90°, thereby advancing the green light and the red light in the light emitting surface 46c direction. The green light transmitted through the bonding surface 46c and the red light reflected by the bonding surface 46c are mixed to a yellow light, which is emitted from the light emitting surface 46c.

Figure 8:
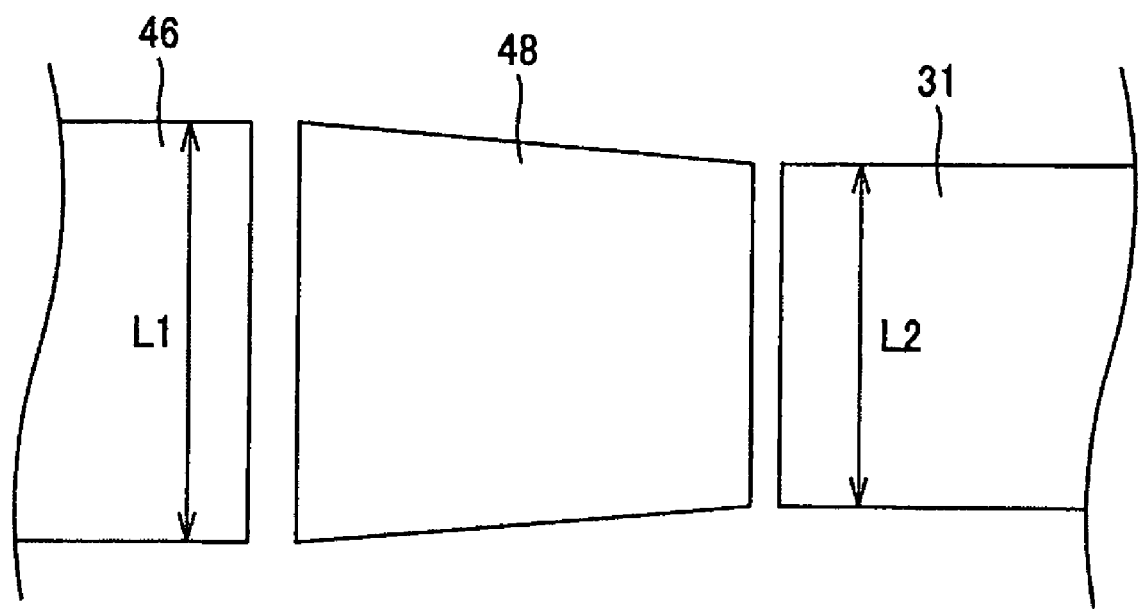
FIG. 8 is a sectional view showing an optical element provided between an optical wavelength and a color mixer.

An optical element 48 guides the light emitted from the color mixer 47 to both end faces 31c, 31d of a longitudinal direction of the optical waveguide 31. Since the optical element 48 is provided, if a length L1 along a thickness direction of the optical waveguide 31 of the dichroic prism 46 is longer than a thickness L2 of the optical waveguide 31, as shown in FIG. 8, the fact that the yellow light emitted from the color mixer 47 is not completely introduced to the end faces 31c, 31d of the longitudinal direction of the optical waveguide 31 but leaked to the outside, can be reduced.

The yellow light emitted from the light emitting surface 46c of the dichroic prism 46 is incident to the outside of the optical waveguide 31 from both the end faces 31c, 31d of the longitudinal direction of the optical waveguide 31 as the yellow light emitted from the light source unit 42.

Therefore, the blue lights emitted from the blue light emitting units 32a, 32b are incident from both the end faces 31a, 31b of the width direction, and the yellow lights emitted from the yellow light emitting units 33a, 33b are incident from both end faces 31c, 31d of the longitudinal direction.

Figure 9:
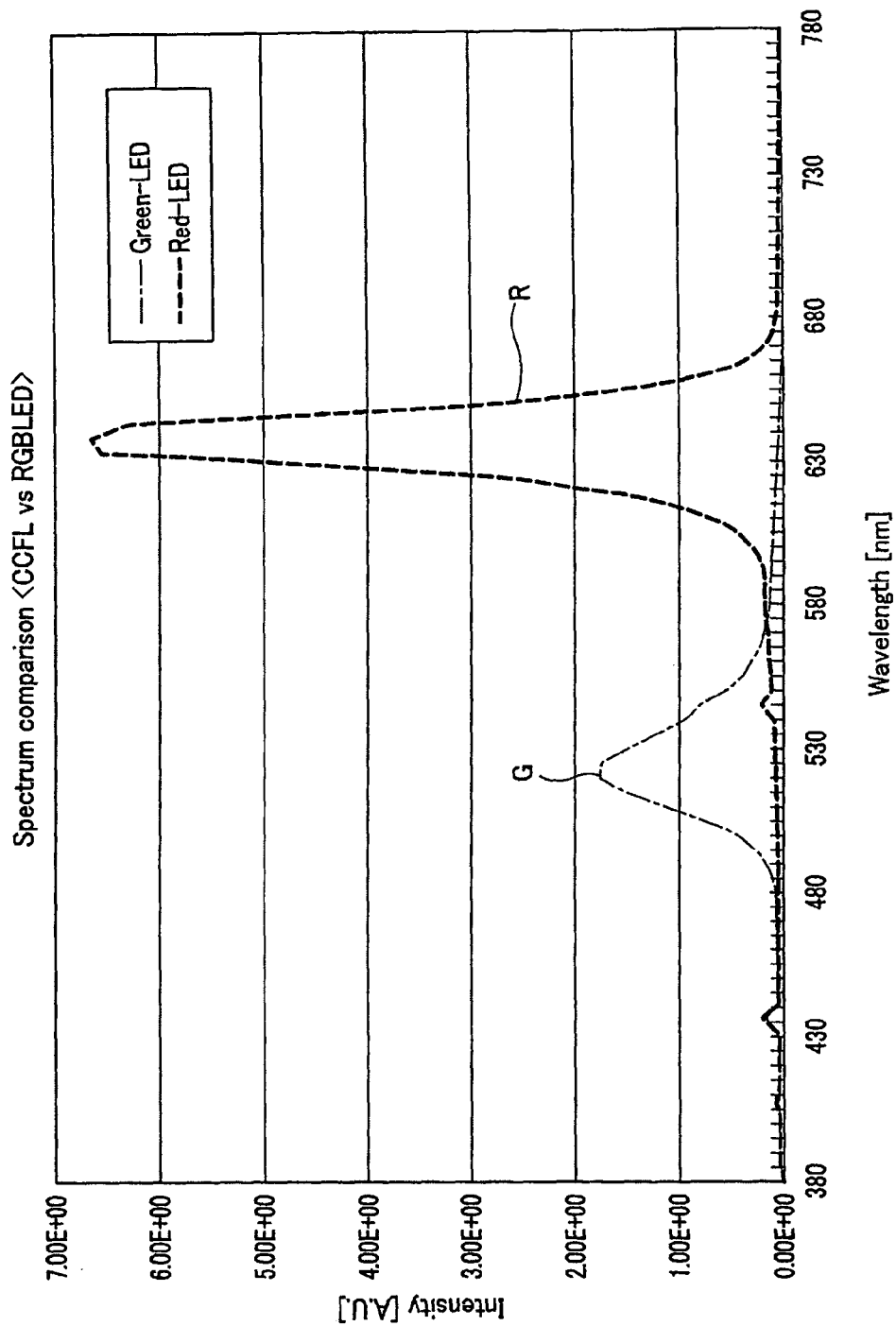
FIG. 9 is a view showing wavelength of the red light emitted from the red LED and wavelength of the green light emitted from the green LED.

The yellow light incident to the optical waveguide 31 is obtained by mixing the red light emitted from the red LED 43R and the green light emitted from the green LED 43G As shown by R in FIG. 9, the red light emitted from the red LED 43R hardly includes a light of the wavelength except the wavelength band showing the red color, and has a high color purity. The green light emitted from the green LED 43G hardly includes the light of the wavelength except the wavelength band showing the green color, as shown by G in FIG. 9 and has a high color purity.

Therefore, to the optical waveguide 31, the red light having a high color purity, and the green light having a high color purity are incident. That is, the lights incident from the yellow light emitting units 33a, 33b to the optical waveguide 31 contain less light of the wavelength except the wavelength band showing the red color and the green color. Therefore, the white light obtained by mixing in the optical waveguide 31 contains less light of the wavelength except the wavelength bands showing the red, green and blue colors as compared with the white light emitted from the CCFL.

Figure 10:
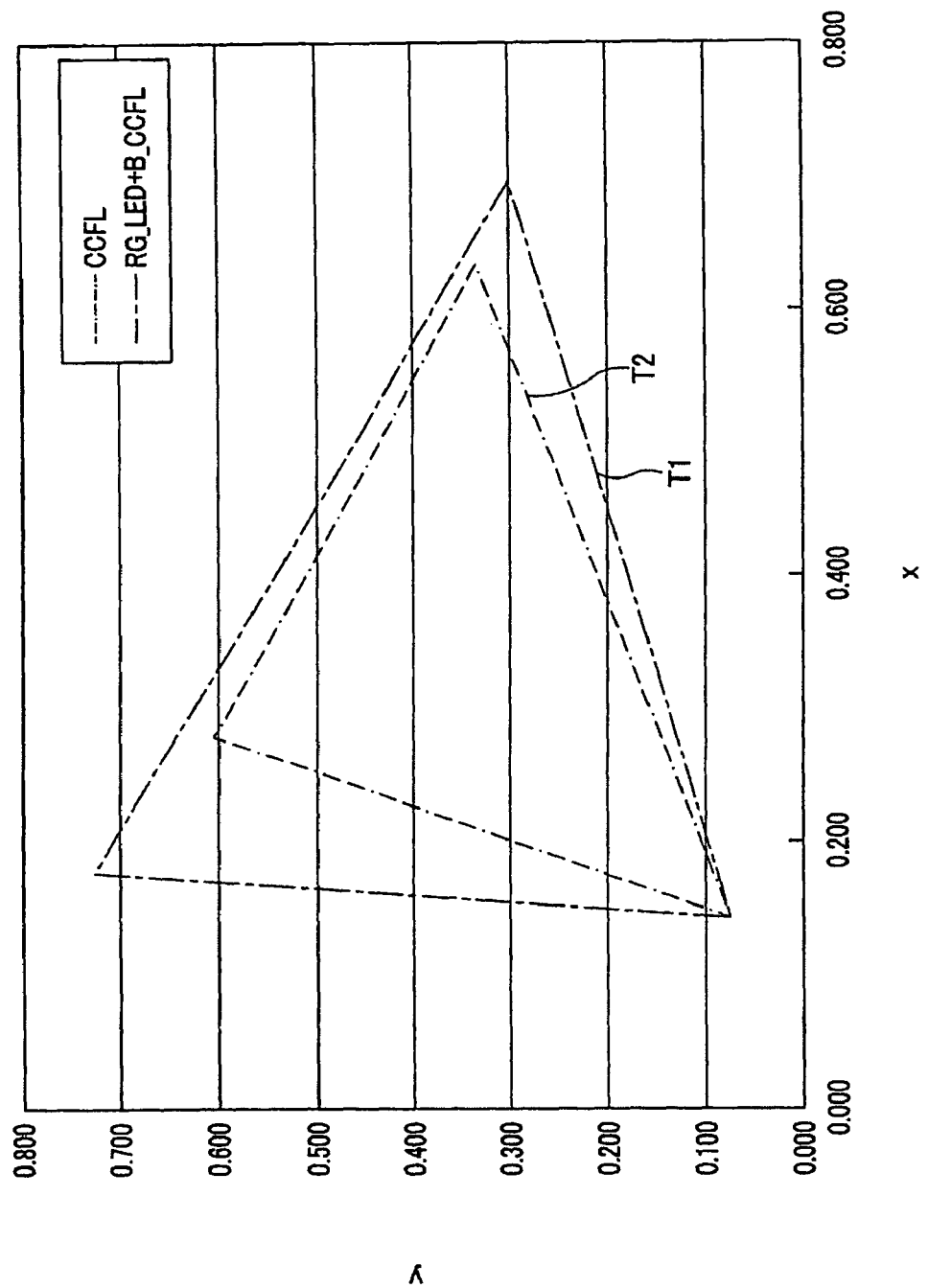
FIG. 10 is a view showing the color reproducibility of the liquid crystal display device having the backlight device.

When the liquid crystal display device 1 having the above-mentioned backlight device 20 and the conventional liquid crystal display device having the backlight device using the CCFL for emitting the white light as the light source are measured for the color reproducibility, and when the measured result is shown by an XYZ display color system proposed by a CIE, as shown in FIG. 10, in the liquid crystal display device 1, as compared with the conventional liquid crystal display device, a value of Y coordinates of a chromaticity point showing the red color is remarkably raised, and a value of the X coordinates of the chromaticity point showing the green color are remarkably raised. Furthermore, an NTSC ratio is raised from 71% to 111%. Incidentally, a triangle T1 in FIG. 10 shows the color reproducibility of the liquid crystal display device 1 according to the present invention, and a triangle T2 shows the color reproducibility of the conventional liquid crystal display device.

More particularly, the liquid crystal display device 1 has high color reproducibility as compared with the conventional liquid crystal display device having the backlight device using the CCFL for emitting the white light as the light source, and can clearly display the image.

As described above, the backlight device 20 emits the white light obtained by mixing the red light emitted from the red LED 43R, the green light emitted from the green LED 43G, and the blue light emitted from the blue CCFL 41B. That is, the backlight device 20 can emit the white light having a light of small wavelength except the wavelength band showing the red, green and blue colors as compared with the backlight device using only the CCFL for emitting the white light as the light source and can illuminate the liquid crystal panel 10. Therefore, the liquid crystal panel 10 is illustrated by the backlight device 20 according to the present invention, the color reproducibility of the liquid crystal display device 1 can be raised.

Also, the backlight device 20 uses the blue CCFL 41B as the light source for emitting the blue light. Therefore, as compared with the case that the LED is used as the light source for emitting the blue light, an amount of the emitting light is large.

Since the blue CCFL 41B has a lower cost than the LED which becomes necessary to emit the blue light of the same amount, the backlight device 20 can suppress a cost for its manufacture by using the blue CCFL 41B as the light source.

Since the blue CCFL 41B generates a little heat as compared with the LED, the backlight device 20 does not need to carry a cooler, such as a fan, etc., by using the blue CCFL 41B as the light source, which can simplify its structure.

Since spread of the light emitted from the blue CCFL 41B is good, the backlight device 20 can easily mix the yellow light with the blue light.

Since the LED for emitting the blue light has an unevenness in luminance of the emitted blue light, when the backlight device 20 using the LED for emitting the blue light is mounted, the color reproducibility of the liquid crystal display device 1 brings about an unevenness. In the backlight device 20, the unevenness of the luminance of the blue light incident in the optical waveguide 31 can be reduced by using the blue CCFL 41B as the light source for emitting the blue light.

Incidentally, in this embodiment, the color mixer 47 is constructed by combining the prisms. However, the color mixer 47 may be constructed except the prisms. For example, the color mixer 47 may be constructed by combining, for example, a reflector or a beam splitter.

Second Embodiment

Figure 11:
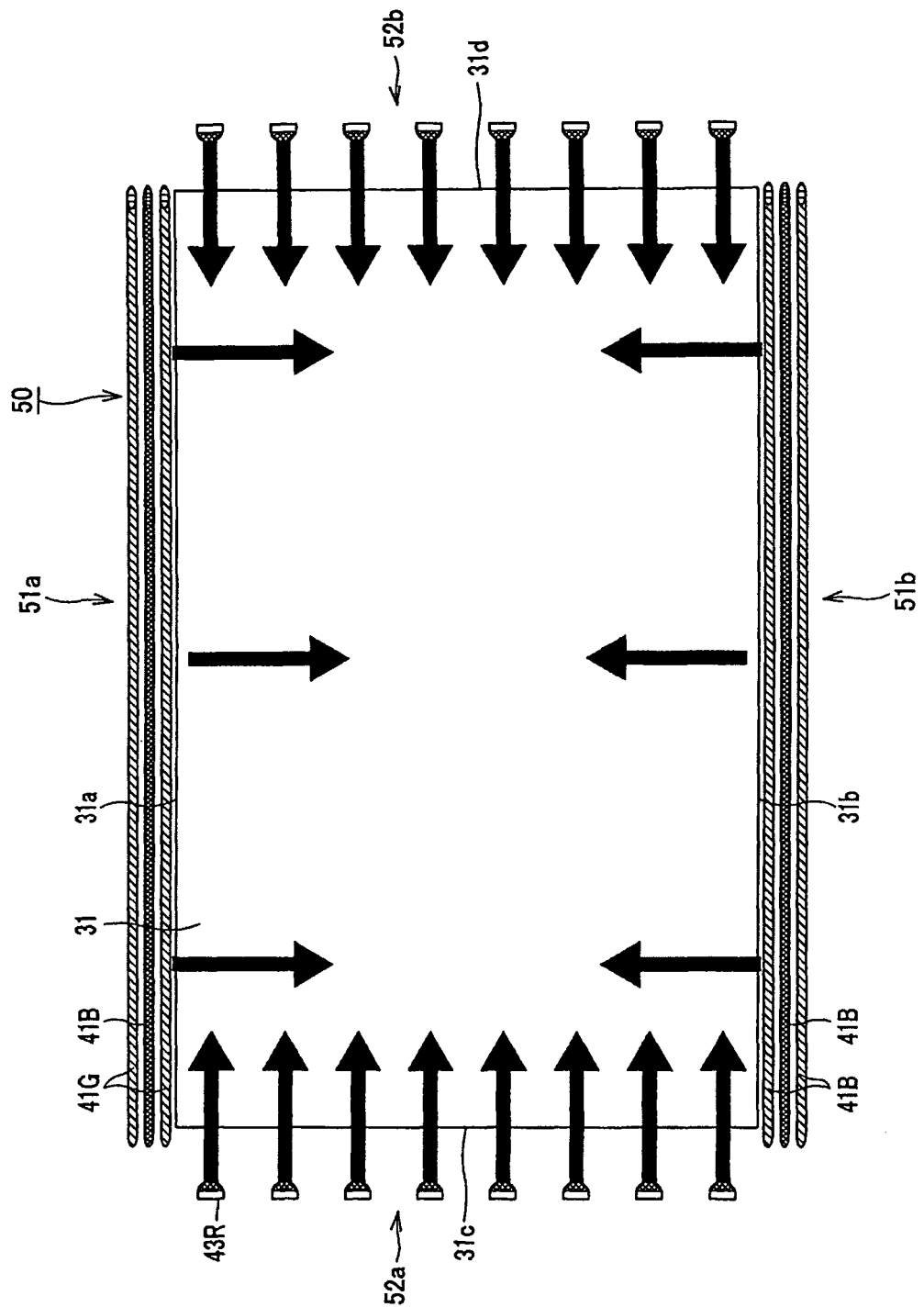
FIG. 11 is a plan view showing another backlight device according to the present invention.

Incidentally, the liquid crystal display device 1 may have a backlight device 50 shown in FIG. 11, instead of the backlight device 20. In the description below, as a second embodiment of the present invention, the backlight device 50 according to the present invention will be described. In the following description, the same component parts as the backlight device 20 described in the first embodiment are given by the same reference numerals as those of the backlight device 20, and the description will be omitted.

As shown in FIG. 11, the backlight device 50 comprises a flat plate-like optical waveguide 31, blue green light emitting units 51a, 51b provided at both ends 31a, 31b of a width direction of the optical waveguide 31, and red light emitting units 52a, 52b provided at both ends 31c, 31d of a longitudinal direction of the optical waveguide 31.

The backlight device 50 has a diffusing sheet 34, a first lens sheet 35, and a second lens sheet 36 sequentially disposed at a light emitting surface 31e side of a main surface of the liquid crystal panel 10 side of the optical waveguide 31, and a reflecting sheet 37 is disposed at a reflecting surface 31f side of an opposed surface to the light emitting surface 31e.

The blue green light emitting units 51a, 51b have a blue CCFL 41B for emitting a blue light, and a green CCFL 41G for emitting a green light. The blue green light emitting units 51a, 51b emit blue green lights obtained by mixing a blue light emitted from the blue CCFL 41B and a green light emitted from a green CCFL 41G The blue CCFL 41B and the green CCFL 41G are set to substantially the same length as a longitudinal direction of the optical waveguide 31, and disposed substantially parallel to the longitudinal direction of the optical waveguide 31. The green CCFL 41G is coated on its inner surface with a phosphor for emitting a green color, for example, an $LaPO_4$:Ce, Th, etc.

The light emitted from the CCFL has small directivity and good spread. Therefore, the blue green light emitted from the blue green light emitting unit 41G spreads over the entirety in the optical waveguide 31.

The red light emitting units 52a, 52b have a plurality of red LEDs 43R. The red LED 43R are aligned in a row along the both end faces 31c, 31d of the width direction of the optical waveguide 31. The eight red LEDs 43R are disposed at the respective red light emitting units 52a, 52b in this embodiment.

Therefore, to the optical waveguide 31, blue green lights emitted from the blue green light emitting units 51a, 51b are incident from both ends faces 31a, 31b of the width direction, and red lights emitted from the red light emitting units 33a, 33b are incident from both end faces 31c, 31d of the longitudinal direction.

Since the red light incident to the optical waveguide 31 is a red light emitted from the red LED 43R, the red light hardly contains the light of the wavelength except the wavelength band showing the red color, and has a high color purity.

Therefore, since the optical waveguide 31 hardly contains the light of the wavelength except the wavelength band showing the red color and the red light having the high color purity is incident on the optical waveguide 31, the white light obtained by mixing in the optical waveguide 31 contains less light of the wavelength except the wavelength band showing the red, green and blue colors as compared with the white light emitted from the backlight device using the CCFL for emitting the white light as a light source. That is, the color reproducibility of the liquid crystal display device 1 can be raised by illuminating the liquid crystal panel 10 by the backlight device 50 according to the present invention.

Third Embodiment

Figure 12:
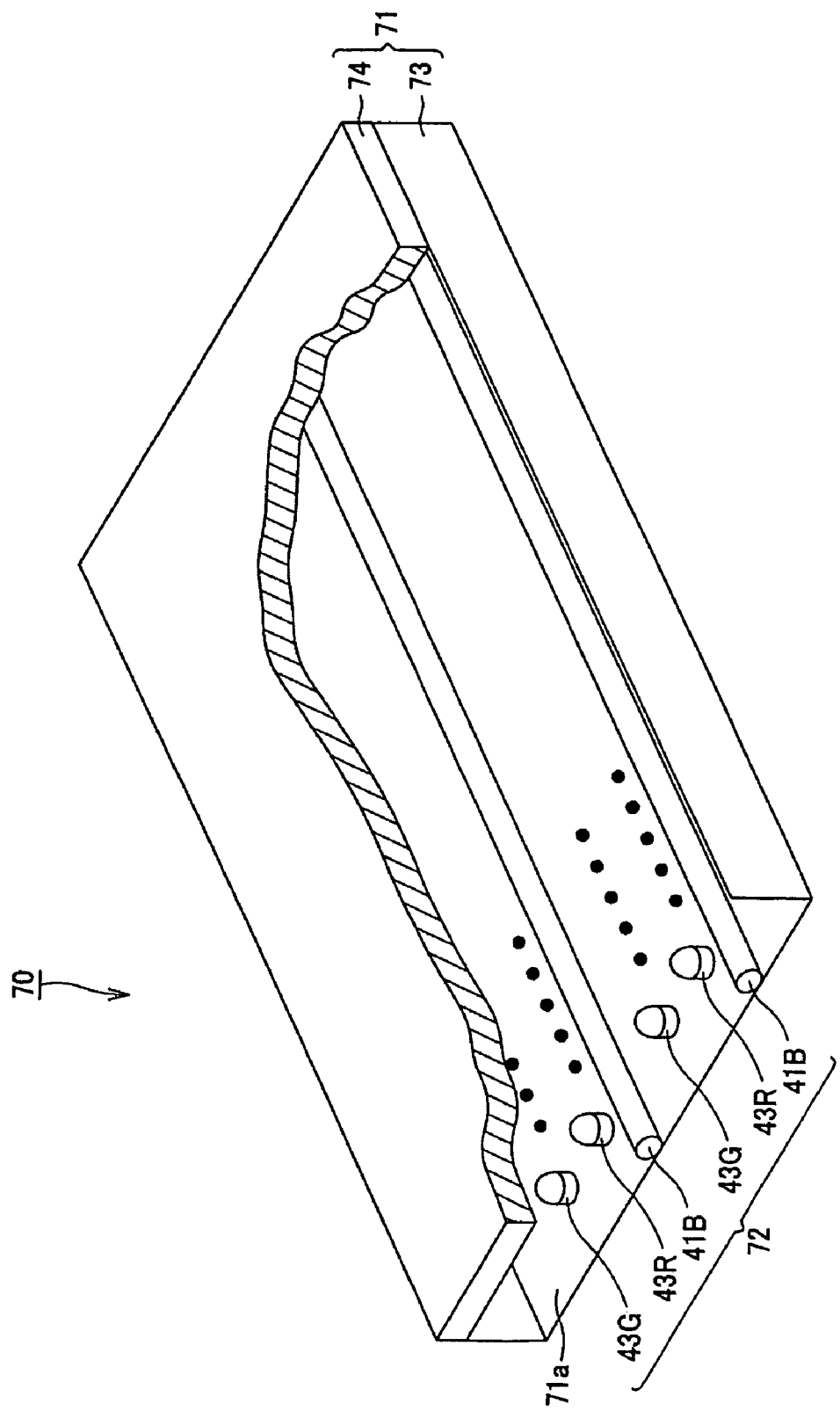
FIG. 12 is a partly cutout perspective view showing still another backlight device according to the present invention.
Figure 13:
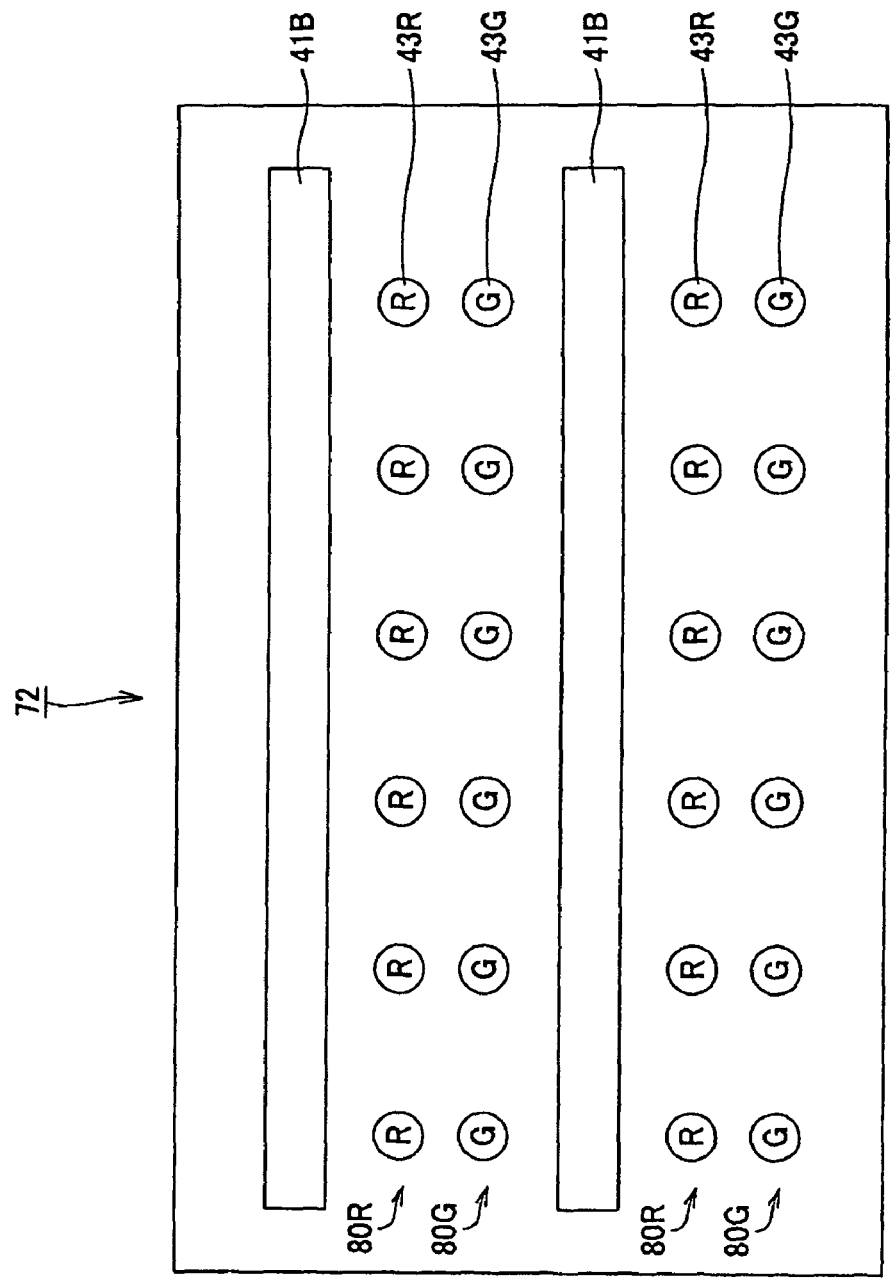
FIG. 13 is a plan view showing arrangement of red LED, green LED and blue CCFL disposed in the light source section of the backlight device.

The liquid crystal display device 1 may also have a backlight device 70 shown in FIG. 12, instead of the backlight devices 20 and 50. In the description below, as a third embodiment of the present invention, the backlight device 70 according to the present invention will be described. Incidentally, in the following description, the same component parts as in the backlight device 20 described in the first embodiment are given by the same reference numerals as the backlight device 20, and the description will be omitted.

As shown in FIG. 12, the backlight device 70 comprises a housing 71 of a substantially rectangular parallelepiped shape, and a light source 72 provided at a bottom 71a of the housing 71. The backlight device 70 is of so-called a direct backlight, and the light emitted from the light source 72 is emitted from the entire upper surface of the housing 40 to perform surface emission to illuminate the liquid crystal panel 10.

In this embodiment, the bottom 71a and four side faces of the housing 71 are formed by a reflecting plate 73, and an upper surface of the housing 71 is formed by a diffusing plate 74.

When the light emitted from the light source 72 is incident to the reflecting plate 73, the reflecting plate 73 reflects the incident light to propagate the light in a direction where the diffusing plate 74 is provided.

The light emitted from the light source 72 or the light reflected by the reflecting plate 73 is incident on the diffusing plate 74 to diffuse the incident light and to emit the light from the entire main surface. The liquid crystal panel 10 is illuminated by the light emitted from the entire main surface of the diffusing plate 74.

The light source 72 has a blue CCFL 41B disposed in parallel with the longitudinal direction of the housing 71, a red LED array 80R having a plurality of red LEDs 43R disposed and aligned in one row in parallel with the blue CCFL 41B, and a green LED array 80G having a plurality of green LEDs 43G disposed and aligned in one row in parallel with the row of the red LEDs 43R. The blue CCFL 41B, the red LED array 80R and the green LED array 80G are disposed alternately at the bottom 71a of the housing 71.

Figure 14:
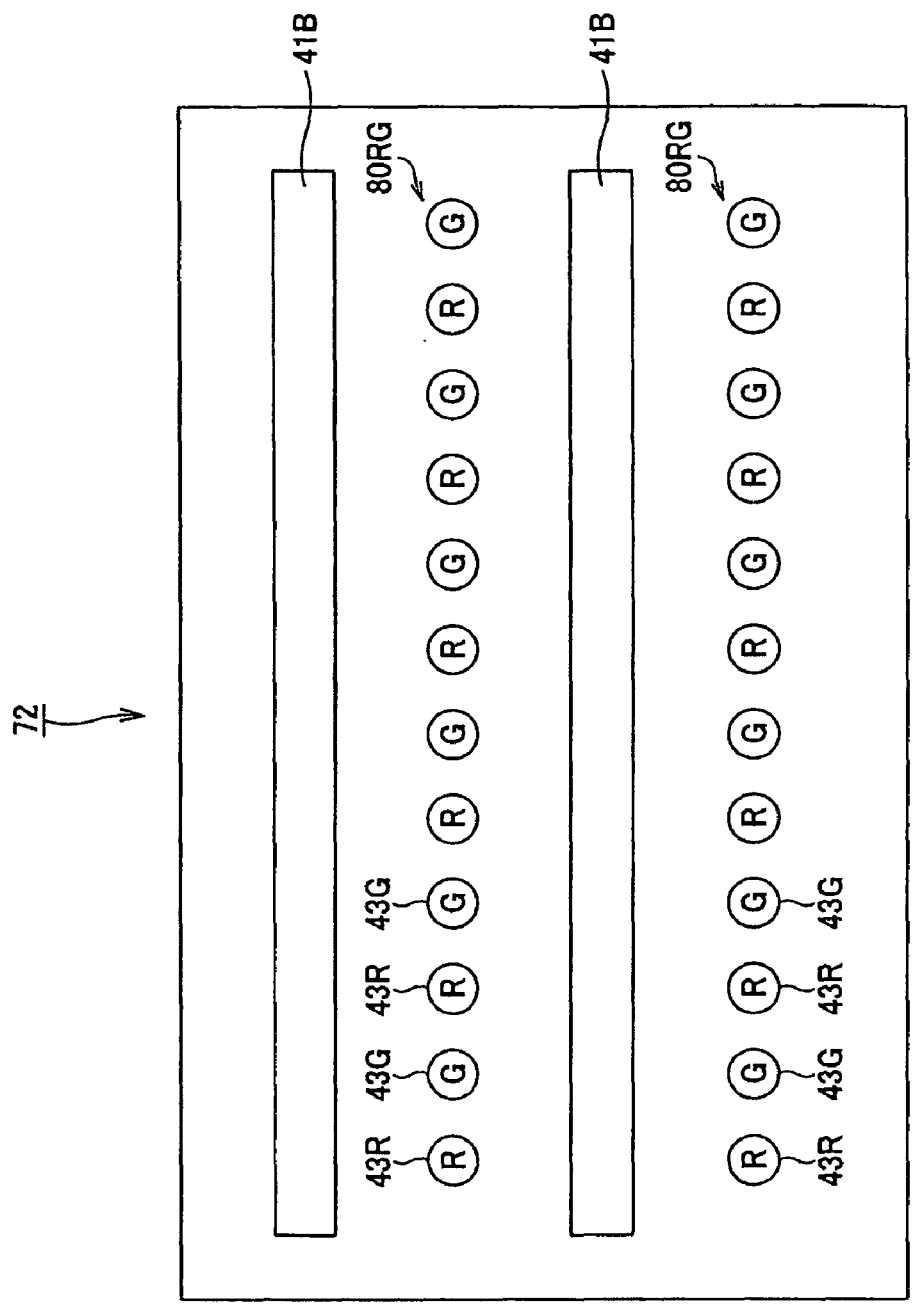
FIG. 14 is a plan view showing another arrangement of the red LED, the green LED and the blue CCFL provided in the light source section.

Incidentally, the arrangement of the blue CCFL 41B, the red LED 43R and the green LED 43G are not limited to the above-mentioned arrangement. For example, as shown in FIG. 14, blue CCFLs 41B arranged parallel to the longitudinal direction of the housing 71 and LED arrays 80RG in which the red LEDs 43R and green LEDs 43G are arranged alternately in a row may be alternately aligned.

Figure 15:
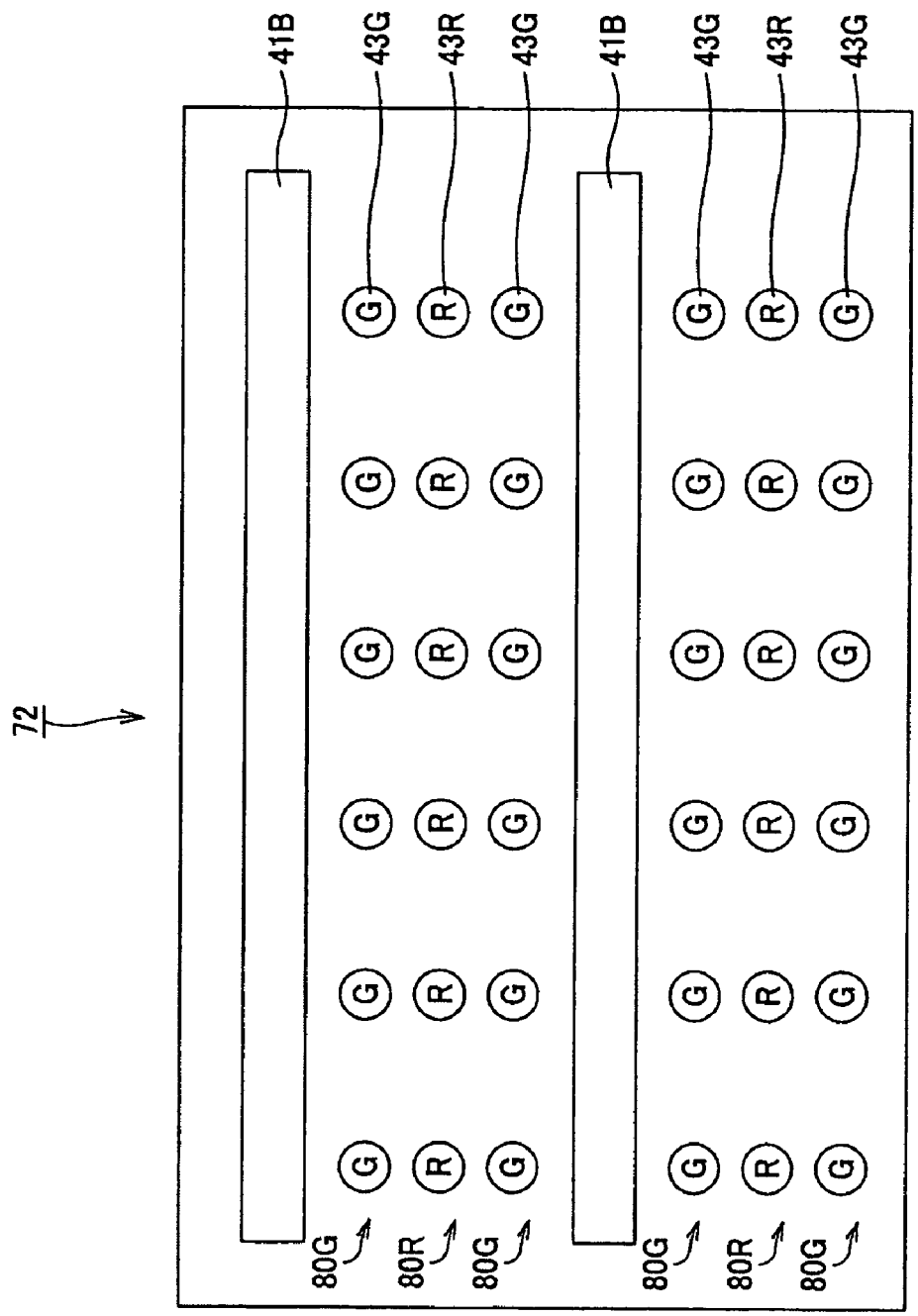
FIG. 15 is a plan view showing still another arrangement of the red LED, the green LED and the blue CCFL provided in the light source section.
Figure 16:
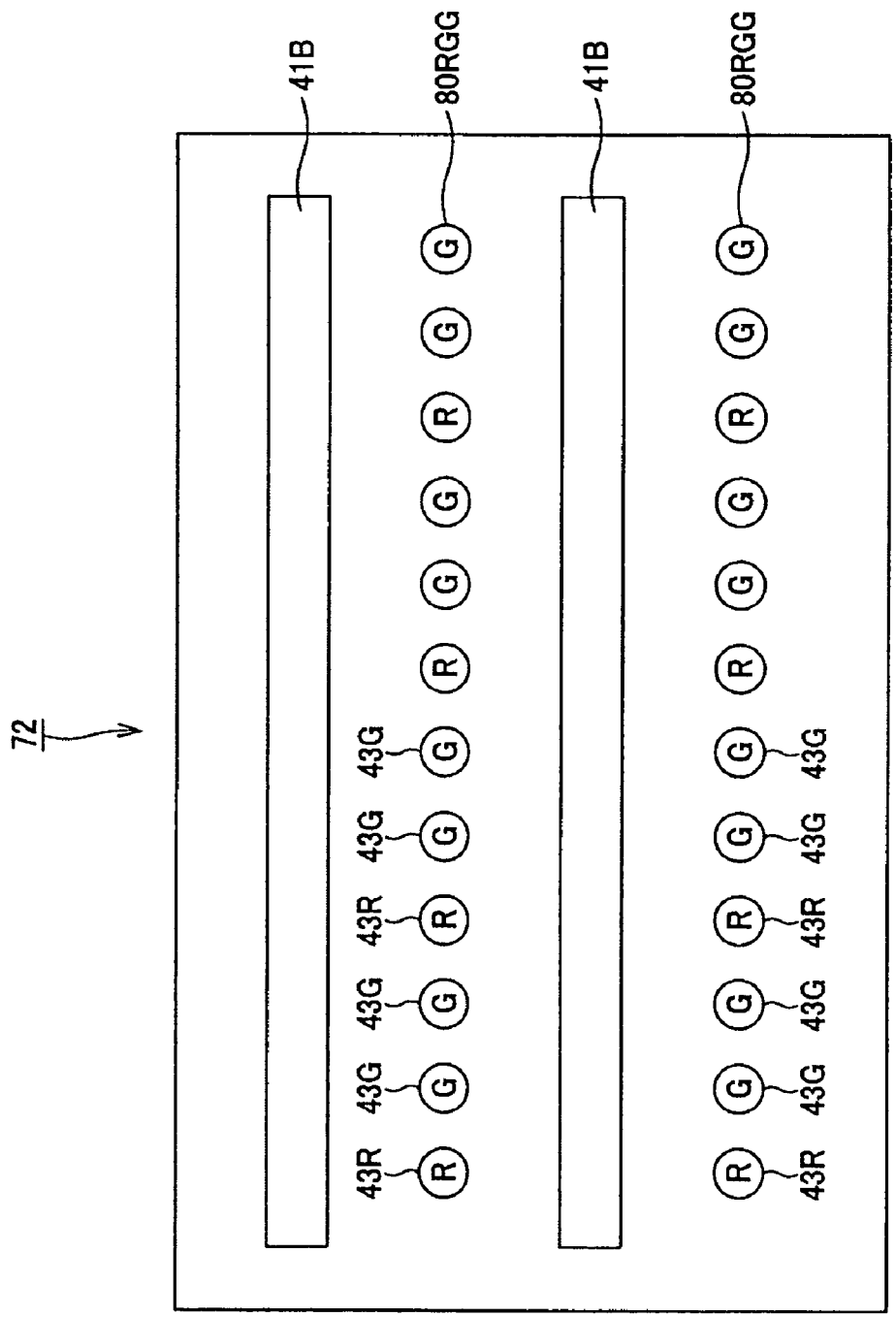
FIG. 16 is a plan view showing still another arrangement of the red LED, the green LED and the blue CCFL provided in the light source section.

Also, as shown in FIG. 15, one row of the red LED array 80R and the two rows of green LED array 80G may be disposed parallel to the blue CCFL 41B disposed parallel to the longitudinal direction of the housing 71. Also, as shown in FIG. 16, blue CCFLs 41B arranged parallel to the longitudinal direction of the housing 71 and LED arrays 80RGG in which the two green LEDs 43G and one red LED 43R are arranged alternately in a row may be alternately aligned.

The number of the green LEDs 43G are doubled, thereby increasing a ratio of the green light included in the white light emitted from the backlight device 70, and an image displayed on the liquid crystal display device 1 becomes clear.

It should be understood by those skilled in the art that various modifications, combinations, sub-combinations and alterations may occur depending on design requirements and other factors insofar as they are within the scope of the appended claims or the equivalents thereof.

What is claimed is:

1. An illuminating device comprising:
   a first light source, including a plurality of light emitting diodes, for emitting light of a wavelength band showing a first primary color;
   a second light source, including a blue fluorescent tube, for emitting light of a wavelength band showing a second primary color that predominantly includes light substantially within a blue wavelength band;
   a third light source, including a green fluorescent tube for emitting a light of a wavelength band showing a third primary color that is substantially within a green wavelength band;
   an optical waveguide for mixing light emitted from said first, second and third light sources to generate a white light; and
   a diffusion member that diffuses the white light.

2. The illuminating device according to claim 1, further comprising:
   wherein the optical waveguide guides a light incident from an end face and reflecting from one entire main surface toward said diffusion member,
   wherein at least the first light source is disposed on one end face of the optical waveguide and the second light source is disposed on another end face of the optical waveguide perpendicular to said one end face where the first light source is disposed,
   the first primary color light emitted from the first light source, the second primary color light emitted from the second light source, and the third primary color light emitted from the third light source are incident on the optical waveguide, the optical waveguide guides the incident first primary color light, the second primary color light and the third primary color light while fully reflecting the incident lights to mix the colors and generate the white light, and emits the generated white light from one entire main surface.

3. The illuminating device according to claim 1, wherein the first primary color is a red color, and the first light source is a plurality of red light emitting diodes for emitting a light of a wavelength band showing a red color.

4. The illuminating device according to claim 1, wherein the first, second and third light sources are disposed so as to face the optical waveguide.

5. The illuminating device according to claim 1, wherein the first, second and third light sources are disposed in a substantially identical plane.

6. An illuminating device comprising:
   a first light source, including a plurality of light emitting diodes, for emitting light of a wavelength band showing a first primary color that predominantly includes light substantially within a red wavelength band;
   a second light source, including a blue fluorescent tube, for emitting light of a wavelength band showing a second primary color that predominantly includes light substantially within a blue wavelength band;

a third light source, including a plurality of green light emitting diodes for emitting light of a wavelength band showing a third primary color that predominantly includes light substantially within a green wavelength band;

a color mixer, separate from fluorescent tubes, for mixing light of the first primary color and the third primary color to a light with a yellow wavelength band; and an optical waveguide for mixing light emitted from said second light source and said color mixer to generate a white light.

7. The illuminating device according to claim 6, wherein the optical waveguide guides a light incident from an end face and reflecting from one entire main surface toward a diffusion member, wherein at least the first light source is disposed on one end face of the optical waveguide and the second light source is disposed on another end face of the optical waveguide perpendicular to said one end face where the first light source is disposed, the first primary color light emitted from the first light source, the second primary color light emitted from the second light source, and the third primary color light emitted from the third light source are incident on the optical waveguide, the optical waveguide guides the incident first primary color light, the second primary color light and the third primary color light while fully reflecting the incident lights to mix the colors and generate the white light, and emits the generated white light from one entire main surface.

8. The illuminating device according to claim 6, wherein the first, second and third light sources are disposed so as to face the optical waveguide.

9. The illuminating device according to claim 6, wherein the first, second and third light sources are disposed in a substantially identical plane.

10. A liquid crystal display device having a transmission type liquid crystal panel, and an illuminating device for illuminating the liquid crystal panel from one main surface side, wherein the illuminating device comprises:

a first light source for emitting light of a wavelength band showing a first primary color;

a second light source for emitting light of a wavelength band showing a second primary color that predominantly includes light substantially within a blue wavelength band; and a third light source for emitting light of a wavelength band showing a third primary color, where the first light source is a plurality of light emitting diodes, the second light source is a blue fluorescent tube, the third light source is green fluorescent tube for emitting a third primary color that is green, and an optical waveguide for mixing together light emitted from the first light source, the second light source, and the third light source, wherein the illuminating device generates a white light by mixing the light of the wavelength band showing the first primary color the light of the wavelength band showing the second primary color and the light of the wavelength band showing the third primary color and illuminates the liquid crystal panel with the generated white light.

11. The liquid crystal display device according to claim 10, wherein the optical waveguide guides the light incident from the end face while fully reflecting the light and emitting the light from one entire main surface, the first light source, the second light source and the third light source are disposed on the end face of the optical waveguide, and the first primary color light emitted from the first light source, the second primary color light emitted from the second light source, and the third primary color light emitted from the third light source are incident on the optical waveguide from the end face, the optical waveguide guides the incident first primary color light, the second primary color light and the third primary color light while fully reflecting the incident lights to mix the colors and generate a white color, and emits the generated white color from one entire main surface.

12. A liquid crystal display device having a transmission type liquid crystal panel, and an illuminating device for illuminating the liquid crystal panel from one main surface side, wherein the illuminating device comprises:

a first light source, including a plurality of light emitting diodes, for emitting light of a wavelength band showing a first primary color that predominantly includes light substantially within a red wavelength band; and a second light source, including a blue fluorescent tube, for emitting light of a wavelength band showing a second primary color that predominantly includes light substantially within a blue wavelength band; and a third light source, including a plurality of light emitting diodes, for emitting light of a wavelength band showing a third primary color that predominantly includes light substantially within a green wavelength band; and a color mixer, separate from fluorescent tubes, that mixes light emitted from the first light source and light emitted from the third light source to produce light of a yellow color, and an optical waveguide for mixing together light emitted from the second light source and the color mixer, wherein the illuminating device generates a white light by mixing the light of the wavelength band showing the first primary color, and the light of the wavelength band showing the second primary color and the light of the wavelength band showing the third primary color, after having been mixed in the color mixer, to illuminate the liquid crystal panel with the generated white light.

13. The liquid crystal display device according to claim 12, wherein the illuminating device includes a optical waveguide for guiding the light incident from the end face while fully reflecting the light and emitting the light from one entire main surface, the first light source, the second light source and the third light source are disposed on the end face of the optical waveguide, and the first primary color light emitted from the first light source, the second primary color light emitted from the second light source, and the third primary color light emitted from the third light source are incident on the optical waveguide from the end face, the optical waveguide guides the incident first primary color light, the second primary color light and the third primary color light while fully reflecting the incident lights to mix the colors and generate a white color, and emits the generated white color from one entire main surface.

14. The illuminating device according to claim 12, wherein the first, second and third light sources are disposed so as to face the optical waveguide.

15. The illuminating device according to claim 12, wherein the first, second and third light sources are disposed in a substantially identical plane.

* * * * *